4 Sheets--Sheet 1.

G. CROMPTON.

Shedding Mechanisms for Looms.

No. 5,719. Reissued Jan. 6, 1874.

*Witnesses*

Wm. McCaffuty

H. M. Rice

*Inventor.*

Geo Compton

4 Sheets--Sheet 2.

G. CROMPTON.

Shedding Mechanisms for Looms.

No. 5,719. Reissued Jan. 6, 1874.

*Witnesses*

M. M. McCaffuty

H. M. Rice.

*Inventor.*

Geo Compton

4 Sheets--Sheet 3.

G. CROMPTON.

Shedding Mechanisms for Looms.

No. 5,719. Reissued Jan. 6, 1874.

*Witnesses*

M. McCaffuty

H. M. Rice

*Inventor.*

Geo Crompton

4 Sheets--Sheet 4.
G. CROMPTON.
Shedding Mechanisms for Looms.
No. 5,719. Reissued Jan. 6, 1874.
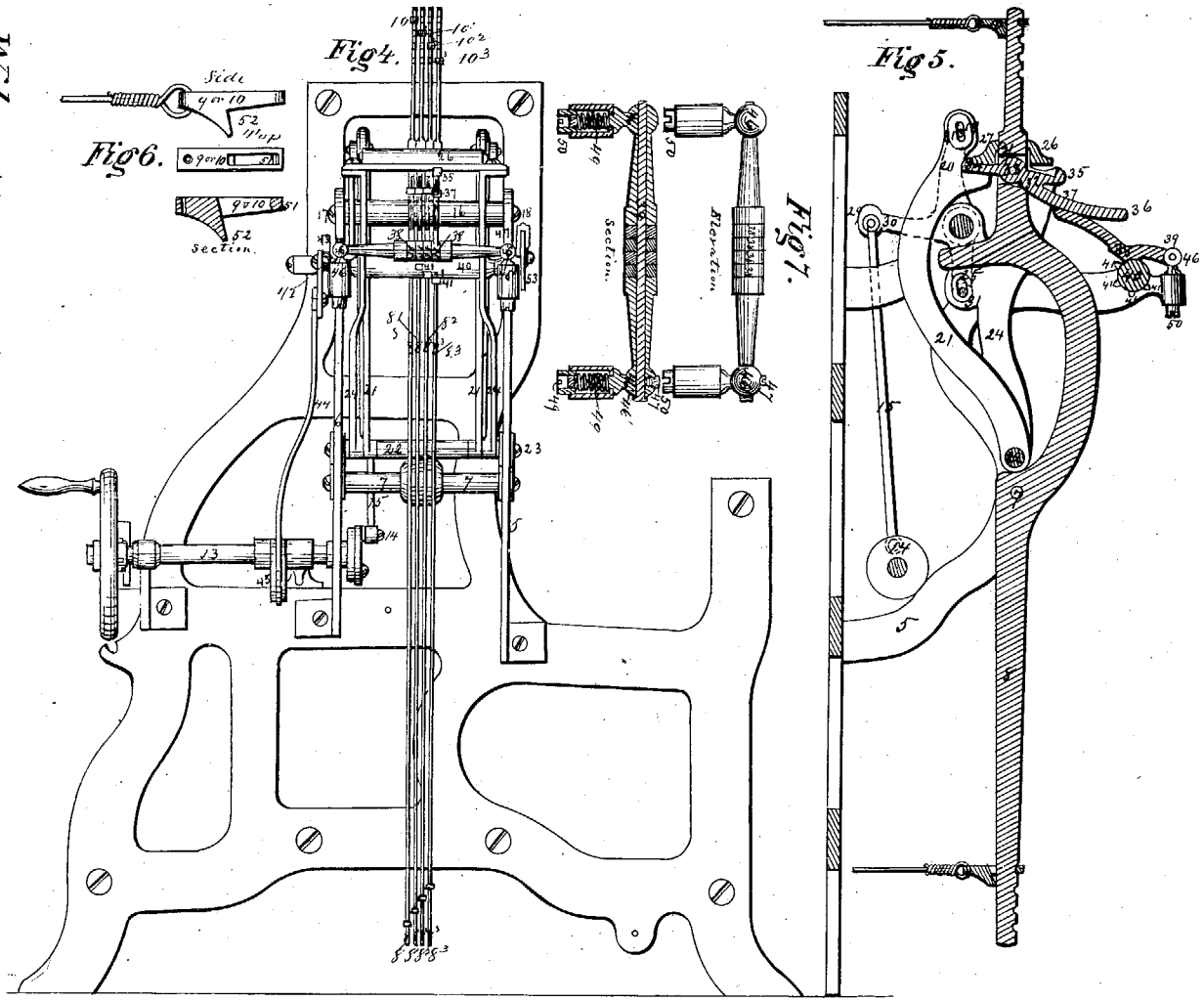
Witnesses
M. J. McCafferty
H. M. Rice
Inventor.
Geo Crompton

UNITED STATES PATENT OFFICE.

GEORGE CROMPTON, OF WORCESTER, MASSACHUSETTS.

IMPROVEMENT IN SHEDDING MECHANISMS FOR LOOMS.

Specification forming part of Letters Patent No. 51,928, dated January 9, 1866; reissue No. 5,719, dated January 6, 1874; application filed May 17, 1869.

DIVISION B.

*To all whom it may concern:*

Be it known that I, GEORGE CROMPTON, of the city and county of Worcester, State of Massachusetts, have invented certain new and useful Improvements in Fancy Looms; and I do hereby declare that the following is a full, clear, and exact description thereof, reference being had to the accompanying drawings and to the numbers of reference marked thereon, of which—

Figure 1:
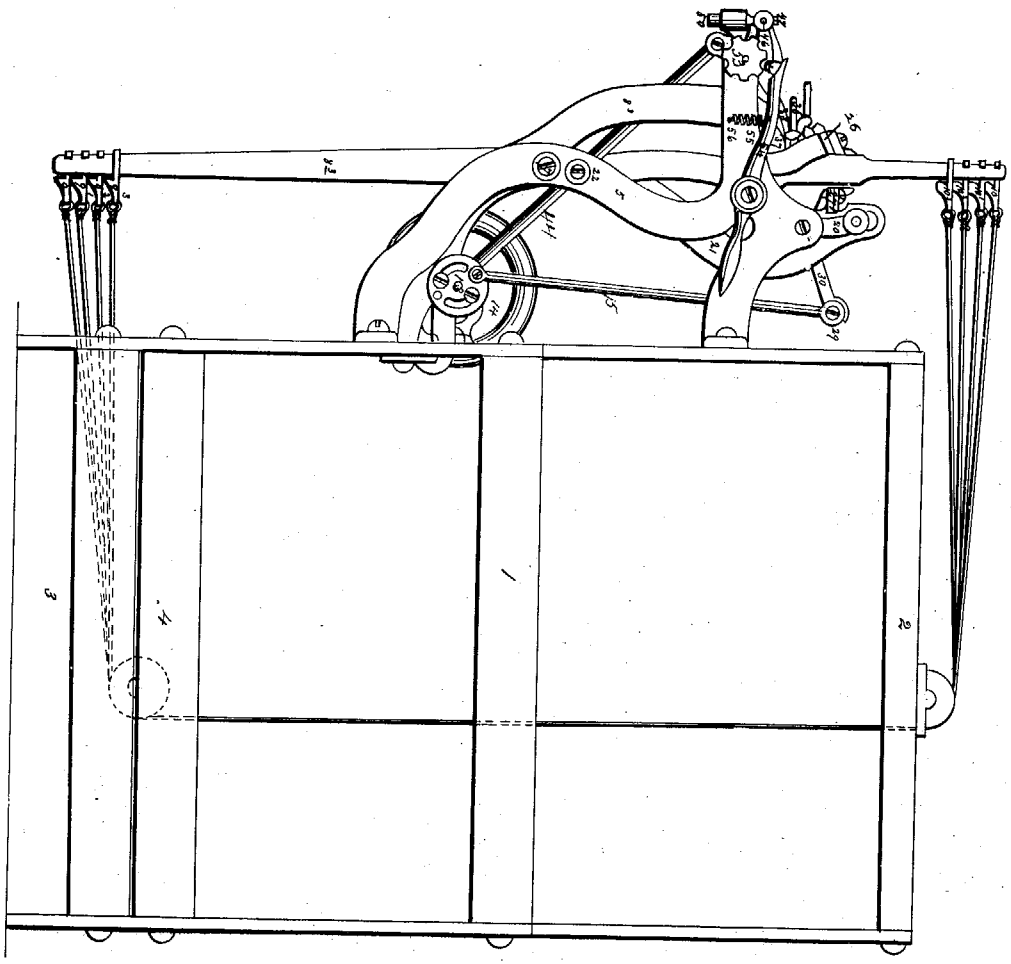
Figure 2:
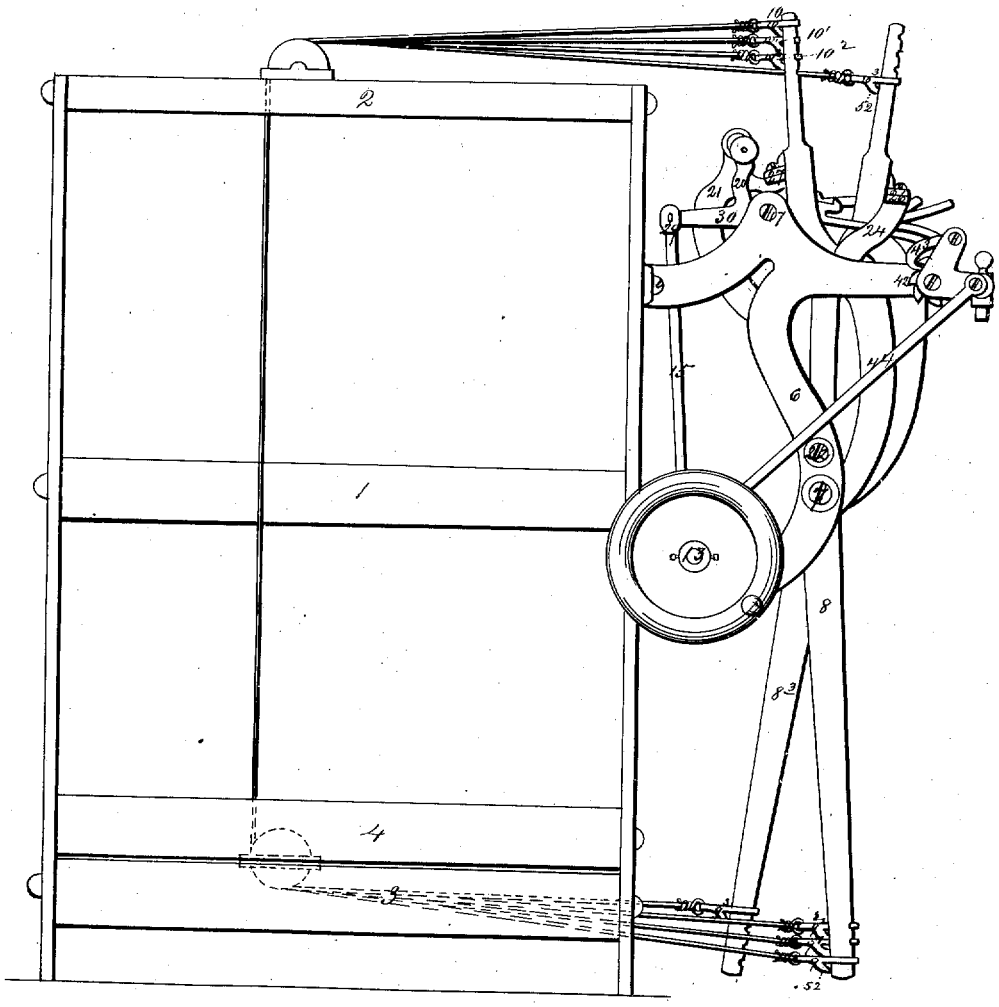
Figure 3:
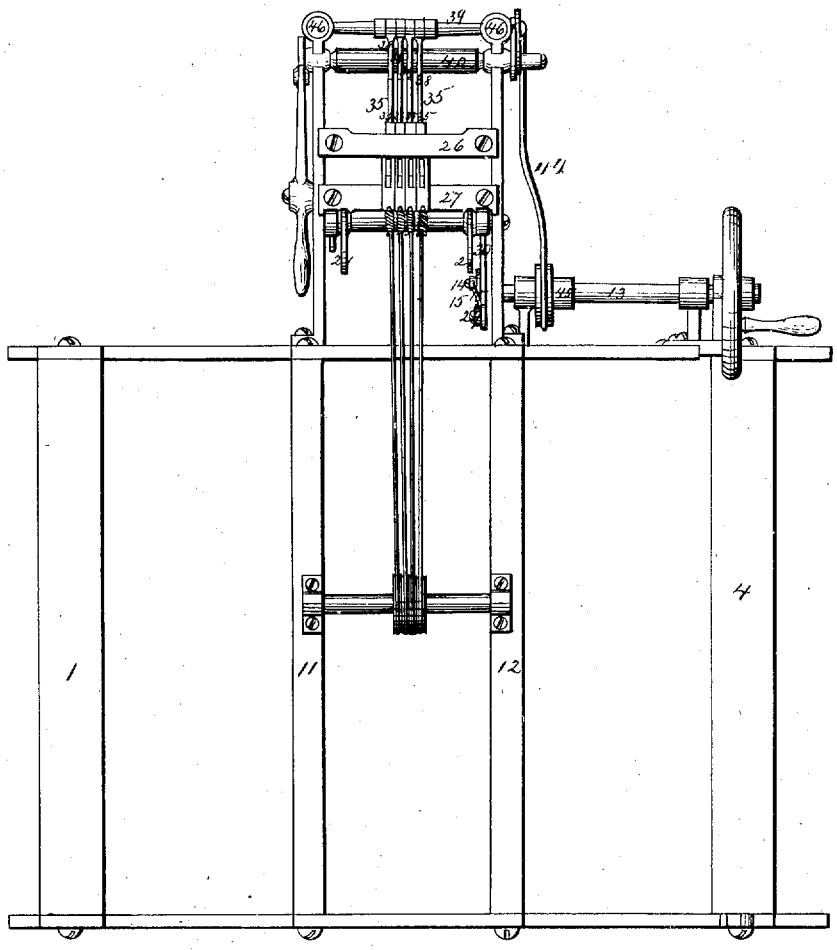

Figure 1 is a front elevation of a loom with my improvements applied. Fig. 2 is a rear elevation. Fig. 3 is a plan. Fig. 4 is an end elevation. Figs. 5, 6, and 7 are detached views. The same numbers denote like parts in all figures.

In the mechanism shown in the drawings, Fig. 1 represents the front elevation of a loom. To the left is attached the apparatus which gives motion to the heddles. 1 is the breast-plate, 2 2 are the top rails, 3 the front girths, and 4 the rear girth, by which the frame-work is held together in the ordinary manner. The subject of the improvement being exclusively the harness motion, no lathe, shafting, or other mechanism common to looms is represented. Sustained at each end by the side brackets 5 and 6 is the rod 7, which supports the four upright levers 8 $8^1$ $8^2$ $8^3$. To the upper extremities of each of these levers are attached loop-like pieces of metal 10 $10^1$ $10^2$ $10^3$, from which a series of cords leads over pulleys or sheaves on top rails 2 2, and which cords, passing down in a vertical line, are carried under another series of sheaves, and thence attached to the lower extremities of the vertical levers by loops 9 $9^1$ $9^2$ $9^3$. In practice the harness-frames are suspended by cords, in the well-known way, between the upper and lower series of sheaves, and through them the warp is drawn, neither of which, however, is represented. Fig. 1 represents the shed closed, as does also the sectional figure 5. 13 is a shaft, (which, in practice, is operated by bevel-gearing from the crank-shaft, which operates the lathe to which it is contiguous,) at one end of which is a crank, 14, which, by a connector, 15, gives an oscillating motion to a shaft, 16, having its bearings 17 and 18 in side brackets 5 and 6. Keyed upon each end of this shaft, inside its bearings, are double-armed levers 20 20, the upper ends of which play in slots 19 19 of the supporters 21 21, which are pivoted at 22, which is a rod extending from one side bracket to the other and resting in them. From this rod rise two similar supporters, 24 24, to those already described, in each of which the lower ends of both double-armed levers play in slots 25 25. To the upper ends of these last-described supporters is secured a bar, 26, extending from one to the other. A similar bar, 27, is secured to the upper extremities of the first-described supporters. The rotation of the crank-pin 14 on shaft 13 from its position in Fig. 1 will draw down the connecting-rod 15, connected to a horizontal arm, 30, and thus operate the supporters 21 21 and 24 24, and their respective bars 26 and 27, the latter being supported and guided by the former. In Fig. 5, one of the upright levers, 8, is represented in longitudinal section taken through its edge. It will be seen that a mortise is made through this lever for the purpose of introducing a jack, 32, and sustaining it upon a pin, 33. Upon this jack are hooks 34 and 35, and its outer end, 36, passes through a mortise or cored slot, 37, in a small lever, 38, resting at 39. This last-named lever or finger lies on the periphery of the cylinder 40. When the jack is not raised its inner hook, 34, is engaged with bar 27, and the outer hook, 35, is below the range of the bar 26. As the bar 27 is moved inward, it takes with it all the jacks which are not elevated by the action of the pins 41 of the pattern-cylinder on the fingers 38, and lowers the leaves of harness with which they are connected. When the bar 26 is moved outward, it engages with the hooks 35 of the jacks 32, which are elevated through the action of the pins 41 on the fingers 38, and, drawing them back, raises their leaves of harness, and perfects the shed. One edge of each of the bars 26 and 27 acts, respectively, as lifter and depresser when making the shed, and on their return movement the outer edges act as eveners, and bring all the jacks in position for a new distribution of their hooks by the cylinder. A pattern-chain is used, in practice, instead of the cylinder.

When the shed is closed, the chain or cylinder is moved by a catch-wheel, 42, and catch 43, by means of the connecting-rod 44 and eccentric 45 on shaft 13. The wheel 53 has depressions, in which rest the rollers in lever 54, to which spring 55 is attached and secured, at 56, to check its momentum and to hold it in its place during the intermission of motion, at which time the series of projections and blanks uppermost on the chain or cylinder distribute the hooks to form the shed, each series of projections and blanks varying the pattern, as required, (as is usual in looms of this class,) as represented in Figs. 1, 4, and 3. The rod 39 extends between and is sustained at each end in bearings 46, and secured by set-screw 47, and supports the fingers 38 $38^1$ $38^2$ $38^3$, which are pivoted upon it and lie upon the cylinder or chain. The bearings of the rod being kept down by spiral springs 48 48, through which bolts 49 49 pass, and the springs being compressed and retained by nuts 50 50, when the rod 39 is raised too far, so as to force the jack 32 against the unyielding lifter-bar, (as it would be by a pin which is too long, or by the untimely motion of the chain, as sometimes happens,) the springs 48 48 are contracted, and after the passage of the pin again expanded, and bring the bearings 46 46 down and retain them upon their seats, as shown in Fig. 7. The loops 9 $9^1$ $9^2$ $9^3$ 10 $10^1$ $10^2$ $10^3$, attached to the lower and upper extremities of the heddle-levers, are shown at Fig. 5, enlarged in section, and also top and side views. The loops are so slotted as to snugly fit the extremities of the heddle-levers, and are slightly rounded at the end of the slot 51, to fit any of the series of notches on the levers, and the spur 52, bearing upon the inner edge of the lever, prevents it from falling off the lower end, and from dropping down on the upper end of, the levers.

The first part of my invention is the loop which connects the cords with the levers. These loops much facilitate the adjustment of the cords to the desired position on the levers. The second part of my invention consists in the combination of the auxiliary shaft 13 with the lifter and depresser and pattern-chain. In my loom the axis of the rock-shaft (which actuates the lifter and depresser) and the shaft of the pattern-cylinder or chain are parallel with the side of the loom-frame. This is not a new arrangement; but, heretofore the shaft, which, by means of connecting-rods or other appliances, drove these two shafts, was parallel with the breast-beam and lathe, and the connecting-rods had, of necessity, a rocking motion across the crank-pins. I have obviated this defect by introducing into the loom the auxiliary shaft 13, lying parallel with the side of the loom-frame. I am aware that this auxiliary shaft is not new, and that it has heretofore been used to reciprocate a jacquard-cylinder, as shown in the English patent No. 10,259, of 1844. I do not claim it, therefore, except in combination with and as a means of actuating the rock-shaft and the shaft of the pattern-chain or cylinder.

What I claim as my invention is—

1. The loop which connects the cords with the levers, when constructed substantially as described.

2. The shaft 13, when arranged parallel to the side of the loom-frame, in combination with the rock-shaft which actuates the lifter and depresser, when connected together, substantially as described, and also in combination with the pattern-chain or cylinder, when connected together substantially as described.

GEO. CROMPTON.

Witnesses:
J. A. WARE,
F. A. HOWARD.